United States Patent
Alsup et al.

(10) Patent No.: US 7,921,060 B2
(45) Date of Patent: Apr. 5, 2011

(54) METHODS AND SYSTEMS FOR PRICING PRODUCTS THAT ENHANCE PRODUCTIVITY

(75) Inventors: Eric Michael Alsup, Baldwin City, KS (US); James G. Miles, Olathe, KS (US)

(73) Assignee: Intervet International B.V., Boxmeer (NL)

( * ) Notice: Subject to any disclaimer, the term of this patent is extended or adjusted under 35 U.S.C. 154(b) by 206 days.

(21) Appl. No.: 11/803,928

(22) Filed: May 15, 2007

(65) Prior Publication Data

US 2008/0195559 A1 Aug. 14, 2008

Related U.S. Application Data

(60) Provisional application No. 60/900,478, filed on Feb. 8, 2007.

(51) Int. Cl.
*G06F 17/00* (2006.01)
(52) U.S. Cl. .................................................. 705/400
(58) Field of Classification Search ............ 705/400
See application file for complete search history.

(56) References Cited

U.S. PATENT DOCUMENTS

| | | | |
|---|---|---|---|
| 4,256,569 A * | 3/1981 | Wallace | 209/3.3 |
| 6,333,062 B1 * | 12/2001 | Fontana et al. | 426/635 |
| 2001/0039500 A1 * | 11/2001 | Johnson | 705/1 |
| 2004/0117238 A1 * | 6/2004 | Inman et al. | 705/10 |
| 2006/0248024 A1 * | 11/2006 | Funaki et al. | 705/400 |

OTHER PUBLICATIONS

Agra Europe, "UK Farm Costings Present Gloomy Picture," Oct. 23, 1998, p. N/1(1).*

* cited by examiner

*Primary Examiner* — John W Hayes
*Assistant Examiner* — Nathan Erb
(74) *Attorney, Agent, or Firm* — TraskBritt

(57) ABSTRACT

A method for pricing a productivity enhancing product or method, such as a feed additive, a fertilizer, or the like, that includes consideration of an expected or realized added benefit from the productivity enhancing product or method to an end user and the price that is expected to be received or has been received by the end user. Programs and systems with which such a pricing method are used are also disclosed.

12 Claims, 1 Drawing Sheet

METHODS AND SYSTEMS FOR PRICING PRODUCTS THAT ENHANCE PRODUCTIVITY

CROSS-REFERENCE TO RELATED APPLICATION

This application claims the benefit of priority, under 35 U.S.C. §119(e), to U.S. Provisional Application No. 60/900,478, filed Feb. 8, 2007, the disclosure of which is hereby incorporated herein, in its entirety, by this reference.

FIELD OF INVENTION

The present invention relates generally to results-based pricing methods and systems for any application, such as methods and systems for pricing products or methods that effect improved production or manufacturing efficiencies. The present invention relates, for example, to methods and systems for pricing products that facilitate or enhance growth of agricultural products, such as feed additives for administration to livestock and, more specifically, to results-based methods and systems for pricing such productivity enhancing products.

BACKGROUND OF RELATED ART

Conventionally, feed additives, fertilizers, and other products that facilitate or enhance growth of agricultural products have been sold to end users (e.g., ranchers, farmers, other agricultural workers, and etc.) in customary fashion at fixed prices upon delivery to the end user. The prices of growth-facilitating products are typically based upon a package price, a per unit price (e.g., price per unit weight, price per volume, and etc.), or the like.

The realized prices and futures prices for agricultural goods fluctuate constantly. When the price of a particular agricultural product is particularly low, agricultural businesses are more reluctant to spend money on growth-facilitating products that are sold at fixed prices.

Accordingly, there is a need for a pricing system that provides agricultural businesses with flexibility that represents variations in the value that they may receive for their agricultural products.

SUMMARY

The present invention includes methods and systems for pricing goods or techniques that facilitate or enhance manufacturing or production efficiencies, including, but not limited to, growth of agricultural products. Such goods and techniques, which may include use of specialized equipment, or particular materials, processes, or programs, are collectively referred to herein, for the sake of simplicity, as "productivity enhancing products."

In a method that incorporates teachings of the present invention, an end user, or recipient, such as an agricultural business (e.g., ranch, farm, and etc.), may obtain a productivity enhancing product (e.g., feed additive, fertilizer, and etc.) from a supplier, or source, at a price that represents an expected or actual added (e.g., financial) benefit to the end user. The price of the productivity enhancing product may be based on a predetermined portion of the expected or actual added benefit to the end user.

In another aspect, the present invention includes a program (e.g., a computer program, and etc.), for quantifying the price of productivity enhancing products that have been used to grow agricultural products.

According to another aspect, the present invention includes a system for determining the expected or actual added benefit provided to an end user by a productivity enhancing product. Such a system includes a quantification element for determining the total amount of, for example, an agricultural product grown with the productivity enhancing product, as well as computation unit for setting a price for the productivity enhancing product based on a number of fluctuating factors, which may include the total amount grown with the productivity enhancing product. As an example, the computation unit may be configured or programmed for comparing the total amount to a corresponding "normalized" amount, such as the amount historically grown without the productivity enhancing product, and for comparing an actual or expected value for the total amount to a value of the "normalized" amount. Such a comparison provides a value of the added benefit expected to be received or that has actually been received by the end user. The computation element may also calculate the portion of the added benefit to be remitted to the supplier of the productivity enhancing product.

Other features and advantages will become apparent to those of ordinary skill in the art through consideration of the ensuing description, the accompanying drawings, and the appended claims.

BRIEF DESCRIPTION OF THE DRAWINGS

In the drawings, which depict embodiments of various aspects of the invention.

Figure 1:
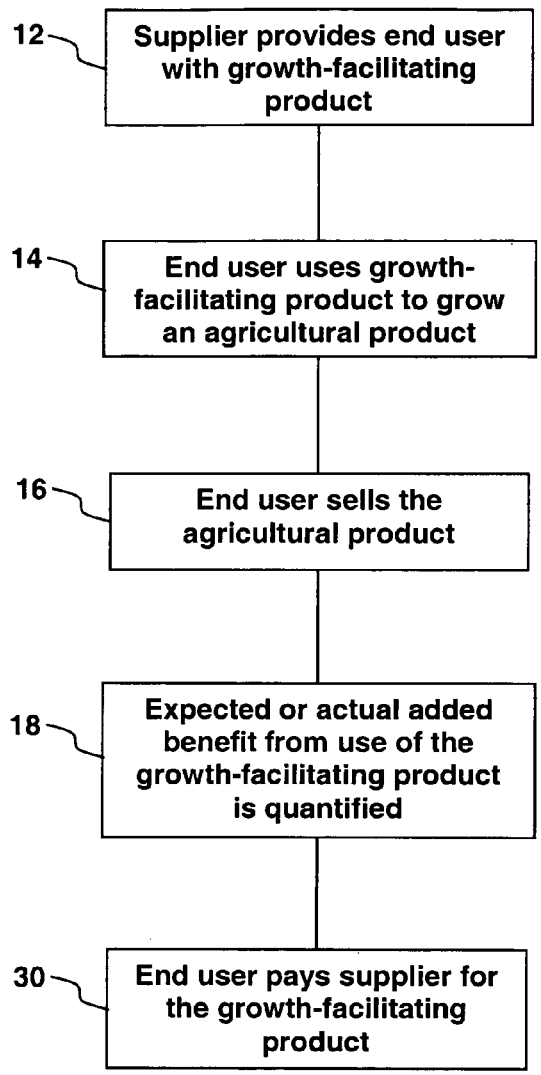
FIG. 1 is a flow chart that depicts an embodiment of a method of facilitating or enhancing growth of agricultural products or otherwise enhancing productivity according to the present invention.
Figure 2:
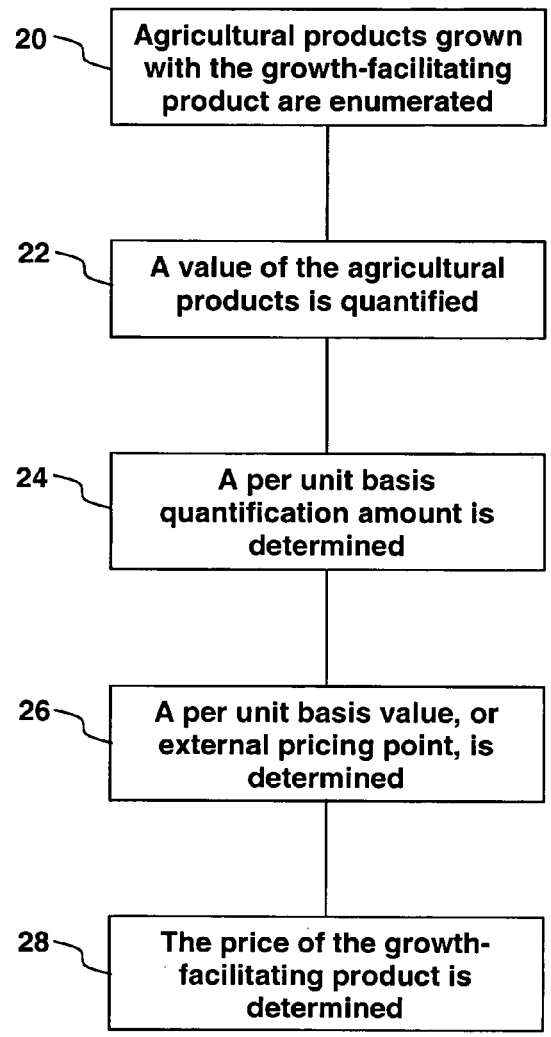
FIG. 2 is a flow chart that illustrates an example of the manner in which the benefits and price of a productivity enhancing product may be quantified in accordance with teachings of the present invention.

While the flow charts of FIGS. 1 and 2 display various acts in a particular order, the depicted order should merely be considered as an example of the manner in which the acts may be conducted, and not as requiring that the acts occur in the depicted order.

DETAILED DESCRIPTION

With reference to FIG. 1, an embodiment of a method for pricing products (e.g., feed additives, fertilizers, and etc.) or techniques that are intended to facilitate or enhance growth of an agricultural product (e.g., livestock, a crop, and etc.), or "productivity enhancing products," is depicted.

At reference character 12 of FIG. 1, a supplier provides an end user with one or more productivity enhancing products. This transfer may be accompanied with the passage of instructions for use. If the productivity enhancing products are not paid for during the initial transaction, the end user may also be required to execute a contract that establishes the terms of the end user's receipt and/or use of the productivity enhancing products, as well as the end user's obligations to the supplier upon sale of agricultural products grown using the productivity enhancing product. Such a contract may set forth a variety of additional terms, including, but not limited to, the manner in which any added benefit is to be calculated, as well as the portion of the added benefit to be paid by the end user to the supplier.

Additionally, the initial transaction between the supplier and the end user may be preceded by or accompanied by an enumeration of the quantity of agricultural products (e.g., "heads" of livestock, crop size (e.g., acreage), and etc.) with which the productivity enhancing products are to be used by the end user. Such information may be used to determine the amount of productivity enhancing product to be provided to the end user.

Once the initial transaction has occurred, the end user uses the productivity enhancing product to grow agricultural products, as shown at reference character 14 of FIG. 1. The specifics of such use may comply with instructions that the supplier has provided to the end user, be governed by terms of the agreement, be reported to the supplier or a designated third party, or any combination of the foregoing. Use of a productivity enhancing product may be accompanied by continued instruction by or input from the supplier or a designated third party to facilitate optimization of the benefits of the productivity enhancing product.

Once a growth phase for the agricultural products is complete (e.g., livestock have reached a predetermined age, livestock are brought to market, crops are harvested, and etc.), the agricultural products are sold, or "taken to market," as indicated at reference character 16 of FIG. 1. Sales of the agricultural products may be conducted in any manner and in any context that is generally recognized in the relevant agricultural field as acceptable for the type of agricultural product being sold, or may be governed by terms of any prior agreement (e.g., the above-mentioned contact) between the supplier and the end user.

The benefit that the productivity enhancing product provides to the end user is quantified at reference character 18 of FIG. 1. This act of quantification may be predicted, based on past results, futures, or other values, or may occur during or after the sale of agricultural products that have been grown with the productivity enhancing product. Such quantification may be effected in any manner, including, but not limited to, terms that are dictated by the supplier or terms to which the supplier and end user have previously agreed (e.g., in the aforementioned contract).

An embodiment of a method for quantifying the benefit that an end user may expect to receive or has received by use of a productivity enhancing product is depicted in the flow chart of FIG. 2.

At reference character 20 of FIG. 2, the agricultural products that are to be or were grown using the productivity enhancing product and sold by the end user are enumerated. Such enumeration may be effected in terms of units, such as head of livestock, acres of crops, or otherwise. Enumeration may occur before or during an initial transaction between supplier and end user (e.g., at reference character 12 of FIG. 1) or at a later point in time.

At reference character 22 of FIG. 2, a value of the enumerated agricultural products is quantified in terms upon which pricing for the agricultural products is based (e.g., weight, volume, and etc.). Such quantification may include a determination of a per unit (e.g., per head of livestock, per acre of crop, and etc.) revenue value, which may be determined by dividing total revenues by the number of units grown with the productivity enhancing product. The total revenues my be the total expected revenues from the sale or sales of agricultural products that are to be grown with the productivity enhancing product (which may be based on past sales of similar agricultural products, on futures prices, and etc.) or the actual revenues received from the sale or sales of agricultural products that have been grown with the productivity enhancing product.

At reference character 24 of FIG. 2, a per unit basis quantification amount (e.g., a per head weight for livestock, a per acre amount for crops, and etc.) is determined for agricultural products of the same type as those sold by the end user and that have not been grown with the productivity enhancing product. The basis quantification amount may be determined or derived from data obtained from a variety of sources, including, without limitation, privately collected data (e.g., data collected by the supplier), information from the United States Department of Agriculture (USDA), CATTLENET, or any other source. Alternatively, the basis quantification amount may be a predetermined amount or any other amount that is agreed upon (e.g., in the aforementioned contract, at a later point in time, and etc.) between the supplier and the end user.

A per unit basis value, which is also referred to as an "external pricing point" (EPP), may be assigned to the per unit basis quantification amount at reference character 26 of FIG. 2. The per unit basis value may be determined in a number of ways, including, but not limited to, determining a per unit (e.g., per head, per weight, per volume) price of agricultural products that were not grown with the productivity enhancing product and that were sold in a predetermined time period. Without limiting the scope of the present invention, such a time period may include a set time period (e.g., year, month, week, day, and etc.) before the productivity enhancing product is provided to the end user, a set time period (e.g., year, month, week, day, and etc.) before the end user sells agricultural product that have been grown with the productivity enhancing product, a price or average price received for similar agricultural products on the same day, a price that was actually received by the end user, or in any other suitable manner. Alternatively, the per unit basis value may be a value that has been agreed upon between the supplier and the end user prior to the end user's sale of agricultural products (e.g., in the aforementioned contract, at a later point in time, and etc.). Such a price may be based on prior sales of the same type of agricultural product, on a futures price for that type of agricultural product (e.g., beef or live cattle futures, and etc.), a specific "grid" price offered by a meat packer, or any other acceptable price.

The per unit basis value is, of course, normalized to the per unit basis quantification amount. As an example, if the per unit basis quantification amount is in terms of weight, a price per unit weight (e.g., pounds, kilograms, and etc.) may be multiplied by that weight to determine the per unit basis value.

The per unit basis value and the per unit revenue value are then compared, at reference character 28 of FIG. 2, to determine the price of the productivity enhancing products. The price may be determined through a series of calculations or, more simply, by multiplying a value-added "pricing factor" by the price per unit weight.

Examples of the manner in which such a calculations may be made follow:

Example 1

The productivity enhancing product ZILMAX®, available from Intervet, Inc., of Millsboro, Del., is to be fed to cattle at a rate of 75 mg per head per day for the last 30 days of a five month feeding period. Thus, each head of cattle will receive about 2.25 g of the productivity enhancing product before being slaughtered and sold.

The average beef carcass weight (i.e., the per unit basis quantification amount) is determined from USDA published data. When compared with the average carcass weight of cattle to which the productivity enhancing product has been administered, it is determined that, when sold, the average carcass weight, per head of cattle to which the productivity enhancing product was administered exceeds the average carcass weight of cattle that did not receive the productivity enhancing product by 25 pounds.

The per unit basis value is determined as a USDA-published average beef carcass price (e.g., $140 per 100 pounds of carcass). The added, per carcass value is calculated by multiplying 25 pounds per carcass by $1.40 per pound, which equals $35 per carcass. The supplier receives 67% of the added value, which amounts to $23.45 per carcass, or $23.45 per 2.25 g of the productivity enhancing product.

The price per bag of feed, which includes the productivity enhancing product as an active ingredient, is determined by multiplying the price per gram (i.e., $23.45/2.25=$10.4222 . . . in this example) by the amount of active ingredient in each bag of feed (in this example, 480 g in each 10 Kg bag of feed, which results in price of $5,002.67 per 10 Kg bag).

This calculation may be condensed by providing a pricing factor, which is based on predetermined carcass weight, pricing, and benefit values, and may be normalized to a value per unit weight of carcass (e.g., in terms of dollars per 100 pounds of carcass weight). In this example, a pricing factor based on the foregoing data may be rounded to 35.7, which, when multiplied by the average carcass price of $140/100 pounds of carcass, results in a per feed bag cost of $4,998.

Example 2

Again, the productivity enhancing product ZILMAX® is to be fed to cattle at a rate of 75 mg per head per day for 30 days. Thus, each head of cattle will receive about 2.25 g of the productivity enhancing product before being slaughtered and sold.

The cost of each bag of the productivity enhancing product is to be based on live cattle weight (e.g., live cattle futures, and etc.), with an assumption that a specific portion of the live weight (e.g., 62.5%) will provide a useful carcass weight. This specific portion is referred to herein as a "useful percentage" of the agricultural product. The live cattle weight per pound is multiplied by the useful percentage, the average (per head of cattle) added weight, and the pricing proportion (e.g., 67%, ⅔, and etc.) to determine the cost of the productivity enhancing product to the end user per animal, or per administered amount (e.g., 2.25 g) of the productivity enhancing product.

The per animal cost of the productivity enhancing product may then be used to determine the price of a bag of feed that includes the productivity enhancing product.

Example 3

A pricing method may also be based on an added premium. In the example of added benefit that an end user may expect to receive or that has been received by the end user when a productivity enhancing product, such as ZILMAX®, is administered to cattle, pricing of the productivity enhancing product may be based on an increased value per unit weight. Such a calculation may include consideration of an increase (e.g., a disproportionate increase) in valuable cuts of meat (e.g., steaks) in treated cattle relative to less valuable cuts of meat (e.g., chuck roasts).

With returned reference to FIG. 1, at reference character 30 thereof, the end user pays the supplier for the productivity enhancing product. As indicated in the preceding examples, the pricing for such payment may be based on the amount of productivity enhancing product provided to the end user, the number of units (e.g., head of livestock, acres of crop, and etc.) with which the agricultural product is to be used, the actual realized benefit, or in any other manner. Such payment may be made at the time of the initial transaction, after agricultural products that were grown with the productivity enhancing product have been sold, or at any other agreed-upon time.

The present invention also includes computer programs and systems that are configured to effect a pricing method that incorporates teachings of the present invention.

Figure 3:
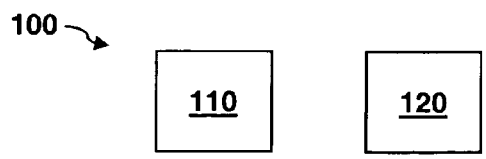
FIG. 3 is a schematic representation of an embodiment of a system that incorporates teachings of the present invention.

A non-limiting example of an embodiment of a system 100 according to the present invention is shown in FIG. 3. System 100 includes a quantification element 110 for determining the total amount of an agricultural product that is expected to be grown or that has been grown with the productivity enhancing product, as well as a computation unit 120.

As an example, quantification element 110 may comprise a scale. As another example, quantification element 110 may be an element by which data regarding an expected added benefit of using a productivity enhancing product may be obtained. Examples of such elements include, without limitation, computer systems, communications devices (e.g., cellular telephones, and etc.), publications, and the like.

Computation unit 120 may be configured or programmed to set a price for the productivity enhancing product based on a number of fluctuating factors. For example, the computation unit may be configured or programmed to compare the total amount to a corresponding "normalized" amount, to compare a value that the end user may expect to receive or has actually received for the total amount to a value of the "normalized" amount, to determine a value that corresponds to the added benefit that the end user may expect to receive or that the end user has actually received, and to calculate the portion of the added benefit to be remitted to the supplier of the productivity enhancing product. As another example, computation unit may be configured or programmed to calculate a price for the productivity enhancing product based on a pricing factor, which may be multiplied by a unit price that the end user may expect to receive. Without limiting the scope of the invention, computation unit 120 may comprise a computer system, a calculator, or simply a writing instrument and an element to be written upon (e.g., a piece of paper).

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed is:

1. A method for pricing productivity enhancing products used in improving growth of agricultural products, the method comprising:

administering at least one productivity enhancing product to at least one agricultural product;

determining each market price at which a pricing calculation is to be made;

determining an average per unit quantity for at least one agricultural product grown without use of the at least one productivity enhancing product;

determining a number of units of the at least one agricultural product grown with use of the at least one productivity enhancing product sold at each market price;

multiplying each market price by the average per unit quantity for the at least one agricultural product grown without use of the at least one productivity enhancing product to obtain a standard per unit price at that market price;

multiplying the standard per unit price for each market price by the number of units sold at that market price to determine a standard revenue value for that market price;

subtracting the standard revenue value from each market price from an expected or actual revenue from sales of the at least one agricultural product grown with use of the at least one productivity enhancing product and sold at that market price to determine a revenue increase for that market price attributable to growth of the at least one agricultural product grown with use of the at least one productivity enhancing product; and calculating, by a computer system, a price for the at least one productivity enhancing product based on the revenue increase for each market price.

2. The method according to claim 1, comprising determining each market price at which the pricing calculation is to be made on a basis of at least one future price.

3. The method according to claim 1, wherein calculating comprises multiplying the revenue increase by a predetermined pricing proportion.

4. The method according to claim 3, wherein the predetermined pricing proportion comprises 67 percent.

5. The method according to claim 1, wherein the at least one agricultural product grown with the at least one productivity enhancing product and the at least one agricultural product grown without the at least one productivity enhancing product comprise livestock and the at least one productivity enhancing product comprises a food additive.

6. The method according to claim 5, wherein the livestock comprise beef cattle, pigs, or sheep.

7. The method according to claim 5, wherein each market price is a price per unit weight.

8. The method according to claim 7, wherein the average per unit quantity is an average animal weight.

9. The method according to claim 8, wherein the average animal weight is an average live animal weight or an average carcass weight.

10. The method according to claim 1, wherein the at least one agricultural product grown with the at least one productivity enhancing product and the at least one agricultural product grown without the at least one productivity enhancing product comprise crops.

11. The method according to claim 1, wherein calculating, by the computer system, the price occurs before the at least one productivity enhancing product is provided to an end user.

12. The method according to claim 1, wherein calculating, by the computer system, the price occurs after the at least one productivity enhancing product has been provided to the end user.

* * * * *